(12) United States Patent
Drexler et al.

(10) Patent No.: US 10,994,460 B2
(45) Date of Patent: May 4, 2021

(54) SYSTEM AND METHOD FOR MOLDING AMORPHOUS POLYETHER ETHER KETONE

(71) Applicant: The Boeing Company, Chicago, IL (US)

(72) Inventors: Julie M. Drexler, Brier, WA (US); David E. Sterling, Seattle, WA (US); Robert F. McDevitt, Seattle, WA (US); Randall A. Rogers, Auburn, WA (US)

(73) Assignee: The Boeing Company, Chicago, IL (US)

( * ) Notice: Subject to any disclaimer, the term of this patent is extended or adjusted under 35 U.S.C. 154(b) by 324 days.

(21) Appl. No.: 15/659,894

(22) Filed: Jul. 26, 2017

(65) Prior Publication Data
US 2017/0320251 A1   Nov. 9, 2017

Related U.S. Application Data

(62) Division of application No. 14/506,816, filed on Oct. 6, 2014, now Pat. No. 9,744,704.

(51) Int. Cl.
| | | |
|---|---|---|
| *F16B 33/00* | (2006.01) | |
| *B29C 45/73* | (2006.01) | |
| *C08G 4/00* | (2006.01) | |
| *B29C 45/14* | (2006.01) | |
| *B29K 71/00* | (2006.01) | |
| *B29L 31/00* | (2006.01) | |
| *B29C 45/00* | (2006.01) | |

(52) U.S. Cl.
CPC ........ *B29C 45/73* (2013.01); *B29C 45/14778* (2013.01); *C08G 4/00* (2013.01); *F16B 33/006* (2013.01); *B29C 45/0001* (2013.01); *B29C 45/14311* (2013.01); *B29K 2071/00* (2013.01); *B29K 2995/0006* (2013.01); *B29L 2031/727* (2013.01); *F16B 33/00* (2013.01)

(58) Field of Classification Search
CPC ...... F16B 33/004; F16B 33/006; F16B 37/14; F16B 41/005; F16B 33/00; B29C 45/0001; B29C 45/14311; B29C 45/14778; B29C 45/73
USPC ............................ 411/372.5–372.6, 373, 377
See application file for complete search history.

(56) References Cited

U.S. PATENT DOCUMENTS

| | | | | |
|---|---|---|---|---|
| 1,296,165 A | * | 3/1919 | Costuma | F16B 41/005 411/406 |
| 3,784,435 A | * | 1/1974 | Bagheri | B05D 7/14 156/293 |
| 4,687,615 A | * | 8/1987 | Kondo | B29C 48/00 264/557 |
| 4,927,307 A | * | 5/1990 | Fitzgerald | B05D 7/14 285/92 |
| 5,328,654 A | * | 7/1994 | Dixit | B29C 55/005 264/108 |
| 5,484,838 A | * | 1/1996 | Helms | C08J 3/22 524/496 |
| 5,639,518 A | * | 6/1997 | Ando | B29C 35/12 427/544 |

(Continued)

*Primary Examiner* — Roberta S Delisle
(74) *Attorney, Agent, or Firm* — Walters & Wasylyna LLC

(57) ABSTRACT

A method for molding amorphous polyether ether ketone including steps of preparing a molten mass including polyether ether ketone, cooling a mold assembly to a temperature of at most about 200° F., and injecting the molten mass into the cooled mold assembly.

20 Claims, 4 Drawing Sheets

(56) References Cited

U.S. PATENT DOCUMENTS

| | | | | |
|---|---|---|---|---|
| 8,651,413 B2* | 2/2014 | Kashiwagi | ............ | B64D 45/02 |
| | | | | 204/196.18 |
| 8,961,091 B2* | 2/2015 | Prest | ............ | B21J 1/006 |
| | | | | 411/424 |
| 9,290,276 B2* | 3/2016 | Watanabe | ............ | B64D 45/02 |
| 2006/0231807 A1* | 10/2006 | Tosaka | ............ | C08K 3/08 |
| | | | | 252/500 |
| 2009/0068244 A1* | 3/2009 | Weber | ............ | A61L 27/443 |
| | | | | 424/423 |
| 2010/0320315 A1* | 12/2010 | Kashiwagi | ............ | B64D 45/02 |
| | | | | 244/1 A |
| 2013/0209775 A1* | 8/2013 | Allen | ............ | C08J 5/18 |
| | | | | 428/220 |
| 2013/0259604 A1* | 10/2013 | Whitlock | ............ | B64D 45/02 |
| | | | | 411/500 |
| 2015/0257263 A1* | 9/2015 | Sethumadhavan | .. | H05K 1/0366 |
| | | | | 257/88 |
| 2016/0264776 A1* | 9/2016 | Wolfe | ............ | C08L 67/04 |
| 2016/0297142 A1* | 10/2016 | Bheda | ............ | B33Y 70/00 |

* cited by examiner

SYSTEM AND METHOD FOR MOLDING AMORPHOUS POLYETHER ETHER KETONE

PRIORITY

This application is a divisional of U.S. Ser. No. 14/506,816 filed on Oct. 6, 2014.

FIELD

This application relates to polyether ether ketone and, more particularly, to amorphous polyether ether ketone and, even more particularly, to molding amorphous polyether ether ketone.

BACKGROUND

Aircraft experience electromagnetic effects (EME) from a variety of sources, such as lightning strikes and precipitation static. Metallic aircraft structures are readily conductive and, therefore, are relatively less susceptible to electromagnetic effects. Basic epoxy-based composite aircraft structures, however, do not readily conduct away the significant electrical currents and electromagnetic forces stemming from electromagnetic effects. Therefore, when composites are used on an aircraft, steps are often taken to protect against electromagnetic effects, such as by incorporating conductive materials into the composites.

Fasteners with integral dielectric layers have been developed in an attempt to provide protection against electromagnetic effects. For example, U.S. Pat. Pub. No. 2013/0259604 discloses a fastener having a fastener head and a layer of dielectric material mechanically attached to the fastener head. The layer of dielectric material may include a polymeric material, such as polyether ether ketone.

Polyether ether ketone is commonly used in the aerospace industry due to its dielectric properties, its ability to maintain strength at elevated temperatures, and its chemical resistance. However, the limited toughness of polyether ether ketone has curtailed its application as a dielectric material in connection with electromagnetic effects-protective fasteners.

Accordingly, those skilled in the art continue with research and development efforts in the field of electromagnetic effects protection.

SUMMARY

In one embodiment, the disclosed method for molding amorphous polyether ether ketone may include the steps of: (1) preparing a molten mass including polyether ether ketone; (2) cooling a mold assembly to a temperature of at most about 200° F.; and (3) injecting the molten mass into the cooled mold assembly. The cooling and injecting steps may be performed in series (e.g., cooling then injecting) or simultaneously (cooling while injecting).

In another embodiment, the disclosed system for molding amorphous polyether ether ketone may include a mold assembly defining a cavity and a fluid channel, a cooling system in fluid communication with the fluid channel, the cooling system supplying a cooling fluid to the fluid channel, wherein the cooling fluid cools the mold assembly to at most about 200° F., and a polymer injection subsystem in fluid communication with the cavity, the polymer injection subsystem supplying a molten mass to the cavity, wherein the molten mass includes polyether ether ketone.

In another embodiment, disclosed is part (e.g., a mechanical part for an aircraft) formed from the disclosed method for molding amorphous polyether ether ketone and/or the disclosed system for molding amorphous polyether ether ketone.

In yet another embodiment, disclosed is a fastener that includes a fastener body and a portion of polyether ether ketone connected to the fastener body, wherein the polyether ether ketone has a crystallinity of at most about 15 percent. For example, the fastener body may include a shaft and a head, and the polyether ether ketone may be connected to the head.

Other embodiments of the disclosed system and method for molding amorphous polyether ether ketone will become apparent from the following detailed description, the accompanying drawings and the appended claims.

DETAILED DESCRIPTION

Figure 1:
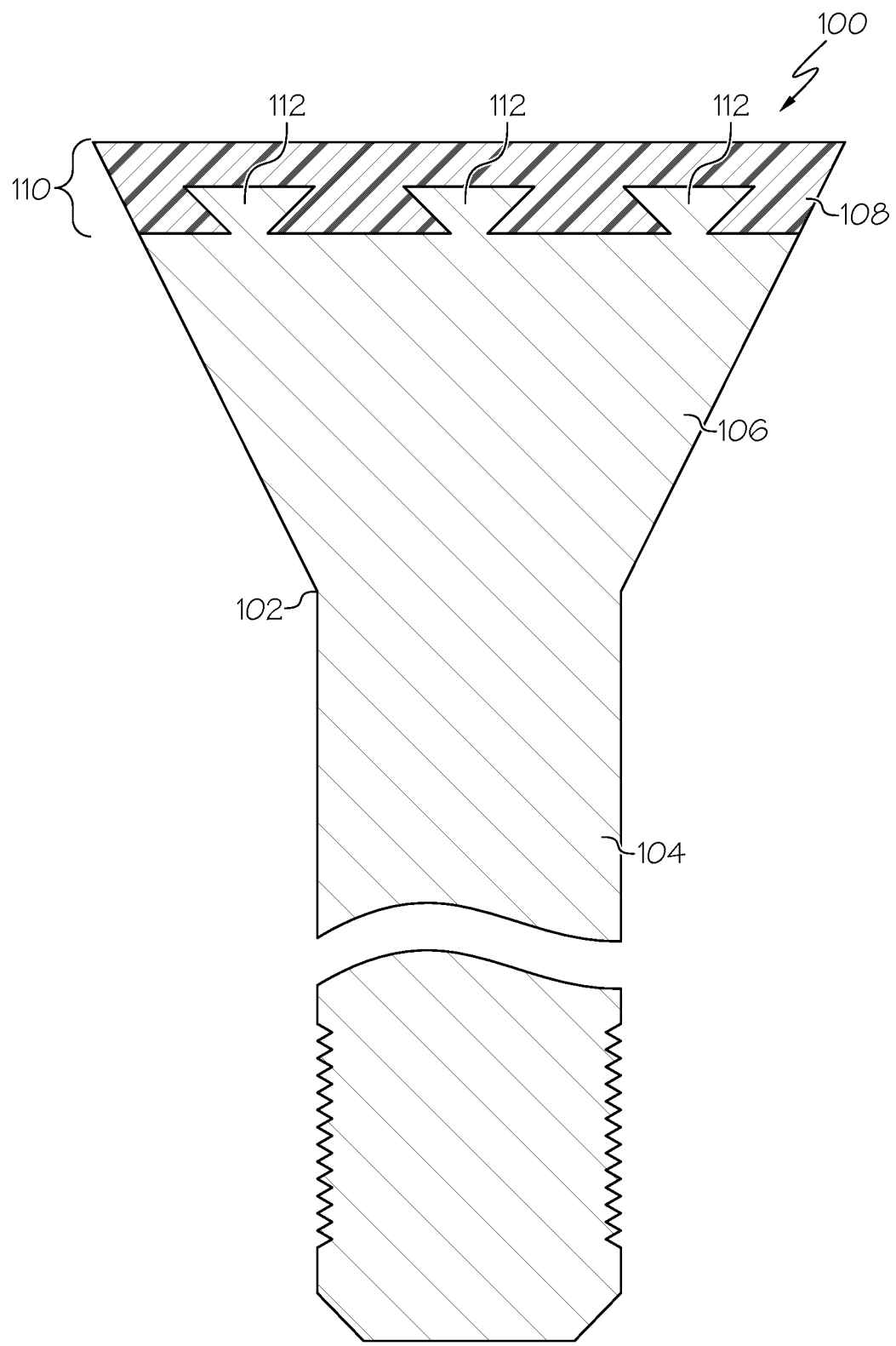
FIG. 1 is a cross-sectional view of an electromagnetic effects-protective fastener formed in accordance with the disclosed system and method for molding amorphous polyether ether ketone.

Referring to FIG. 1, one embodiment of the disclosed electromagnetic effects-protective fastener, generally designated 100, may include a fastener body 102 having a shaft 104 and a head 106 connected to the shaft 104. A portion 108 of amorphous polyether ether ketone may be molded onto the fastener body 102. For example, the portion 108 of amorphous polyether ether ketone may be molded onto the head 106 of the fastener body 102, thereby forming a layer 110 on the head 106, such as on the top of the head 106 (as shown in FIG. 1) and/or on the side of the head 106.

The fastener body 102 may be formed from various materials. As one general, non-limiting example, the fastener body 102 may be formed from a metallic material. As one specific, non-limiting example, the fastener body 102 may be formed from titanium or titanium alloy. As another specific, non-limiting example, the fastener body 102 may be formed from aluminum or aluminum alloy. Furthermore, while a threaded bolt-type fastener is shown in the drawings, those skilled in the art will appreciate that various mechanical fasteners may be used without departing from the scope of the present disclosure.

Various engagement features 112 (e.g., undercut protrusions; a roughed surface; etc.) may optionally be present on the head 106 to enhance the connection between the top layer 110 and the head 106 of the fastener body 102. Additionally or alternatively, an optional tie layer (e.g., an adhesive) may be positioned between the top layer 110 and the head 106 to enhance the connection therebetween.

While the fastener 100 is shown and described as having a portion 108 of amorphous polyether ether ketone molded onto a fastener body 102, fasteners may be formed entirely of amorphous polyether ether ketone without departing from the scope of the present disclosure. Furthermore, those skilled in the art will appreciate that fasteners are only one specific example of parts that may be formed from amorphous polyether ether ketone, in accordance with the present disclosure. Various other parts, such as mechanical aircraft parts, may be molded from amorphous polyether ether ketone using the disclosed system 200 and method 300.

As used herein, an "amorphous" polyether ether ketone refers to polyether ether ketone have a crystallinity that is substantially less than the crystallinity achieved using traditional polyether ether molding techniques. In one expression, the amorphous polyether ether ketone may have a crystallinity of at most about 15 percent. In another expression, the amorphous polyether ether ketone may have a crystallinity of at most about 10 percent. In another expression, the amorphous polyether ether ketone may have a crystallinity of at most about 5 percent. In another expression, the amorphous polyether ether ketone may have a crystallinity of at most about 2 percent. In another expression, the amorphous polyether ether ketone may have a crystallinity of at most about 1 percent. In yet another expression, the amorphous polyether ether ketone may have a crystallinity of about 0 percent.

Without being limited to any particular theory, it is presently believed that molding an amorphous polyether ether ketone, as disclosed herein, results in the layer 110 of the electromagnetic effects-protective fastener 100 having a greater toughness, as compared to a layer formed by molding crystalline (e.g., 30 to 35 percent crystallinity) polyether ether ketone using traditional molding techniques. The tougher amorphous polyether ether ketone may result in the electromagnetic effects-protective fastener 100 being more suitable for use in aerospace applications, such as on an aircraft wing.

Figure 2:
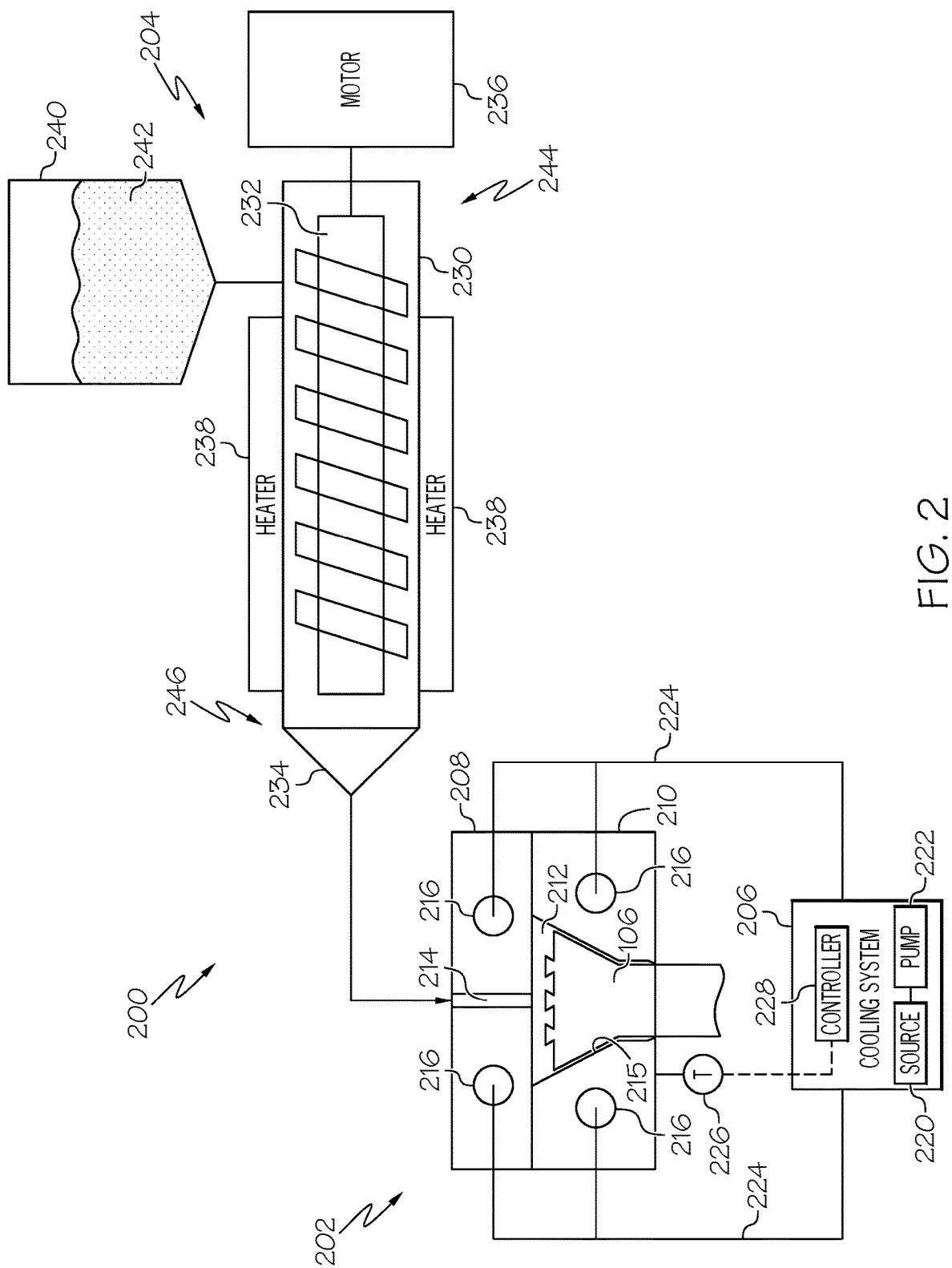
FIG. 2 is a schematic representation of the disclosed system for molding amorphous polyether ether ketone.

Referring to FIG. 2, one embodiment of the disclosed system for molding amorphous polyether ether ketone, generally designated 200, may include a mold assembly 202, a polymer injection subsystem 204, and a cooling subsystem 206. As is described in greater detail herein, the polymer injection subsystem 204 may inject a molten mass of polyether ether ketone (or a polyether ether ketone blend) into the mold assembly 202 while the cooling subsystem 206 may cool the mold assembly 202, thereby yielding an amorphous polyether ether ketone.

The mold assembly 202 may include a first mold plate 208 and a second mold plate 210. The first mold plate 208 may be sealingly, yet releasably, mated with the second mold plate 210 to define a cavity 212 therebetween. The first mold plate 208 may define a channel 214, and the channel 214 may fluidly couple the cavity 212 with the polymer injection subsystem 204. While an axial configuration is shown, various mold configurations may be used without departing from the scope of the present disclosure.

A fastener body 102 (or other component) may be positioned in the mold assembly 202 to receive thereon the molded polyether ether ketone. For example, the second mold plate 210 may define a seat 215, and the head 106 of the fastener body 102 may be seated in the seat 215 of the second mold plate 210. Therefore, the head 106 of the fastener body 102 may at least partially define the cavity 212 of the mold assembly 202.

The first mold plate 208, the second mold plate 210 or both the first and second mold plates 208, 210 may define fluid channels 216. The cooling subsystem 206 may direct a cooling fluid through the fluid channels 216 to cool the mold assembly 202 to the desired temperature (e.g., prior to introduction of the molten mass). Cooling the mold assembly 202 may include cooling the entire mold assembly 202 or only a portion of the mold assembly 202 (e.g., only one of the first and second mold plates 208, 210).

Without being limited to any particular theory, it is believed that cooling the mold assembly 202 to a temperature of at most about 200° F.—which is a significant departure from standard polyether ether ketone molding practices—may yield an amorphous (rather than crystalline) polyether ether ketone. In one realization, the mold assembly 202 may be cooled to a temperature of at most about 150° F. In another realization, the mold assembly 202 may be cooled to a temperature of at most about 100° F. In another realization, the mold assembly 202 may be cooled to a temperature ranging from about 50° F. to about 120° F. In yet another realization, the mold assembly 202 may be cooled to a temperature ranging from about 80° F. to about 100° F.

Various cooling fluids may be used to cool the mold assembly 202 without departing from the scope of the present disclosure. In one variation, the cooling fluid flowing through the fluid channels 216 of the mold assembly 202 may be a liquid. Examples of suitable liquid cooling fluids include, but are not limited to, water, alcohol and glycol. In another variation, the cooling fluid flowing through the fluid channels 216 of the mold assembly 202 may be a gas. Air (e.g., ambient air) is one non-limiting example of a suitable gaseous cooling fluid.

Optionally, the mold assembly 202 (or select portions of the mold assembly 202) may be formed from (or may include) a highly thermally conductive material, such as a highly thermally conductive metal (e.g., copper). The highly thermally conductive material may aid in heat transfer.

The cooling subsystem 206 may be any apparatus or system capable of supplying a cooling fluid to the fluid channels 216 of the mold assembly 202. For example, the cooling subsystem 206 may include a cooling fluid source 220 and a pump 222 configured to pump the cooling fluid through the fluid channels 216 of the mold assembly 202, such as by way of fluid supply lines 224. The cooling fluid may make a single pass through the fluid channels 216 of the mold assembly 202 or, alternatively, may be recirculated through the fluid channels 216.

In one particular implementation, a temperature sensor 226 may be connected to the mold assembly 202 (e.g., to the second mold plate 210). Multiple temperature sensors, while not shown, may be used. The temperature sensor 226 may be in communication with the cooling subsystem 206 (e.g., with a controller 228 associated with the cooling subsystem 206). Therefore, the cooling subsystem 206 may actively control the temperature of the mold assembly 202, such as by controlling the temperature of the cooling fluid being supplied to the mold assembly 202 (e.g., by way of a heat exchanger) and/or by controlling the flow rate of the cooling fluid being supplied to the mold assembly 202 to minimize a difference between a target mold assembly temperature and the actual temperature of the mold assembly 202.

The polymer injection subsystem 204 may be any apparatus or system capable of supplying a molten mass of polyether ether ketone (or a polyether ether ketone blend) to the mold assembly 202. The polymer injection subsystem 204 may form the molten mass by heating the polyether ether ketone to a temperature ranging from about 650° F. to about 750° F., such as from about 670° F. to about 720° F. (e.g., about 710° F.). Therefore, the molten mass of polyether ether ketone may be flowable as it passes to the mold assembly 202 and, ultimately, into the cavity 212.

In one construction, the polymer injection subsystem 204 may be configured as an injection molding machine, and may include a barrel 230, a screw 232, a nozzle 234, a motor 236, one or more heaters 238, and a hopper 240 containing a quantity 242 of polyether ether ketone (e.g., pellets of polyether ether ketone). The screw 232 may be received in the barrel 230 and may be driven by the motor 236. Rotation of the screw 232 within the barrel 230 may urge polyether ether ketone deposited (from the hopper 240) proximate (at or near) the aft end 244 of the barrel 230 to the forward end 246 of the barrel 230 and, ultimately, through the nozzle 234. As the polyether ether ketone moves toward the forward end 246 of the barrel 230, the heaters 238 may heat the polyether ether ketone to form a molten mass. The polymer injection subsystem 204 may inject the molten mass of polyether ether ketone into the mold assembly 202.

The molten polyether ether ketone injected into the mold assembly 202 by the polymer injection subsystem 204 may enter the cavity 212 of the mold assembly 202 where it may be rapidly cooled to form the portion 108 of amorphous polyether ether ketone on the head 106 of the fastener body 102, as shown in FIG. 1. Because the mold assembly 202 is cooled, the rate at which the molten polyether ether ketone is injected into the mold assembly 202 (the injection rate) may be sufficiently high to ensure the cavity 212 is properly and fully filled prior to solidification of the polyether ether ketone. Those skilled in the art will appreciate that the injection rate will depend on various factors, including the temperature of the mold assembly 202, the temperature of the molten mass of polyether ether ketone, the size of the cavity 212 and the shape of the cavity 212.

Figure 3:
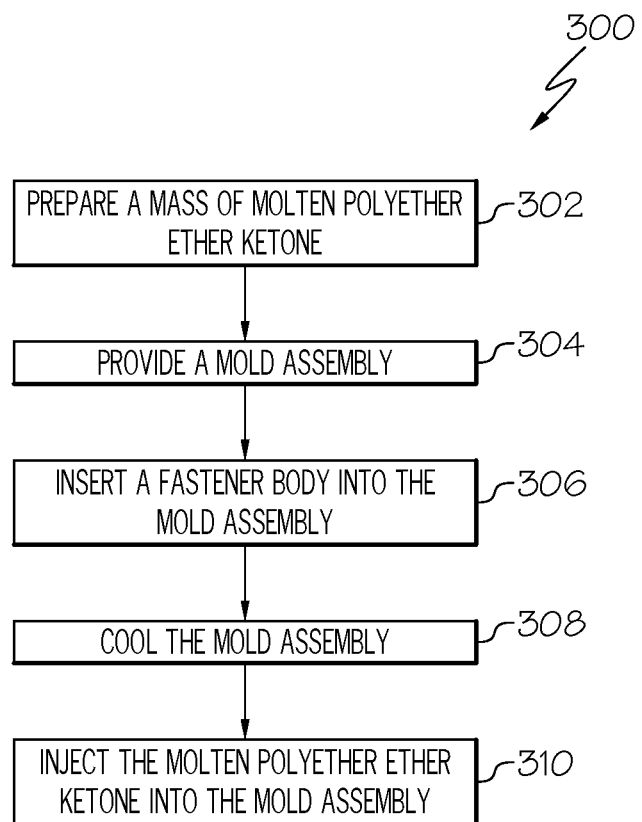
FIG. 3 is a flow diagram of the disclosed method for molding amorphous polyether ether ketone.

Referring to FIG. 3, also disclosed is a method for molding amorphous polyether ether ketone. One embodiment of the disclosed method, generally designated 300, may begin at Block 302 with the step of preparing a molten mass of polyether ether ketone (or a polyether ether ketone blend). The molten mass of polyether ether ketone may be at a temperature ranging from about 650° F. to about 750° F., such as from about 670° F. to about 720° F. (e.g., about 710° F.).

At Block 304, a mold assembly may be provided. The mold assembly may define a cavity. For example, the mold assembly may include a first mold plate sealingly connected to a second mold plate to define a cavity therebetween. A channel in one of the mold plates may provide fluid access to the cavity.

At Block 306, a fastener body may optionally be inserted into the mold assembly. For example, the fastener body may include a head and a shaft, and the head of the fastener body may be seated in a seat defined by one of the mold plates forming the mold assembly. Therefore, together with the first and second mold plates, the fastener body may at least partially define the cavity.

At Block 308, the mold assembly (including the fastener body, if present) may be cooled. In one realization, the mold assembly may be cooled to a temperature of at most about 200° F. In another realization, the mold assembly may be cooled to a temperature of at most about 150° F. In another realization, the mold assembly may be cooled to a temperature of at most about 100° F. In another realization, the mold assembly may be cooled to a temperature ranging from about 50° F. to about 120° F. In yet another realization, the mold assembly may be cooled to a temperature ranging from about 80° F. to about 100° F.

At Block 310, a sufficient quantity of the molten mass of polyether ether ketone may be injected into the cavity of the cooled mold assembly. For example, a screw rotating in a barrel may urge the molten mass of polyether ether ketone into the cavity of the cooled mold assembly. The injection rate may be sufficiently high to ensure the cavity is quickly and fully filled with the polyether ether ketone prior to solidification of the polyether ether ketone.

Accordingly, by cooling the mold assembly prior to and/or during injection of molten polyether ether ketone, the disclosed system 200 and method 300 may yield amorphous (as opposed to crystalline) polyether ether ketone. The amorphous polyether ether ketone may have a higher toughness than crystalline polyether ether ketone and, therefore, may be used in more demanding applications, such as on aircraft.

Figure 4:
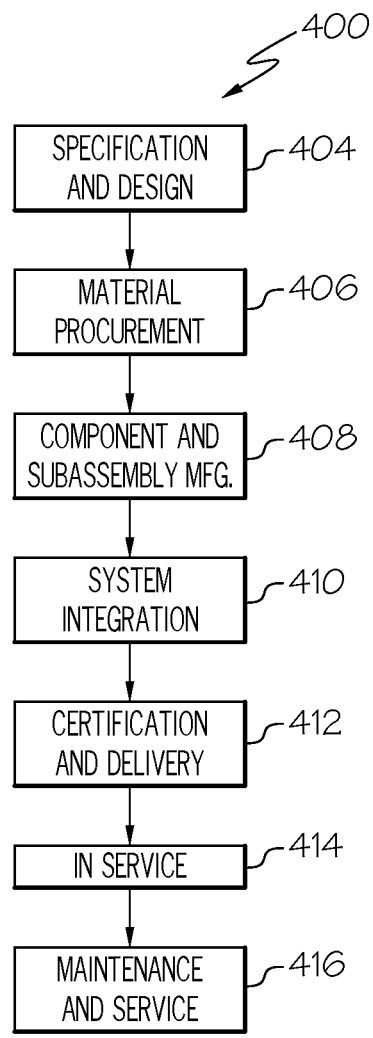
FIG. 4 is a flow diagram of an aircraft manufacturing and service methodology.
Figure 5:
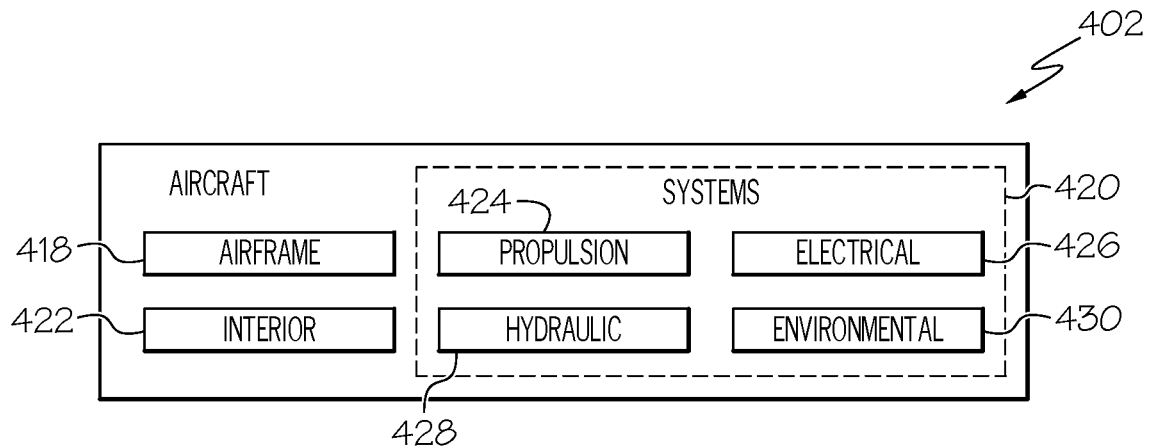
FIG. 5 is a block diagram of an aircraft.

Examples of the disclosure may be described in the context of an aircraft manufacturing and service method 400, as shown in FIG. 4, and an aircraft 402, as shown in FIG. 5. During pre-production, the aircraft manufacturing and service method 400 may include specification and design 404 of the aircraft 402 and material procurement 406. During production, component/subassembly manufacturing 408 and system integration 410 of the aircraft 402 takes place. Thereafter, the aircraft 402 may go through certification and delivery 412 in order to be placed in service 414. While in service by a customer, the aircraft 402 is scheduled for routine maintenance and service 416, which may also include modification, reconfiguration, refurbishment and the like.

Each of the processes of method 400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 5, the aircraft 402 produced by example method 400 may include an airframe 418 with a plurality of systems 420 and an interior 422. Examples of the plurality of systems 420 may include one or more of a propulsion system 424, an electrical system 426, a hydraulic system 428, and an environmental system 430. Any number of other systems may be included.

The disclosed system and method for molding amorphous polyether ether ketone may be employed during any one or more of the stages of the aircraft manufacturing and service method 400. For example, components or subassemblies corresponding to component/subassembly manufacturing 408, system integration 410, and or maintenance and service 416 may be fabricated or manufactured using the disclosed system and method for molding amorphous polyether ether ketone. Also, one or more apparatus examples, method examples, or a combination thereof may be utilized during component/subassembly manufacturing 408 and/or system integration 410, for example, by substantially expediting assembly of or reducing the cost of an aircraft 402, such as the airframe 418 and/or the interior 422. Similarly, one or more of system examples, method examples, or a combination thereof may be utilized while the aircraft 402 is in service, for example and without limitation, to maintenance and service 416.

The disclosed system and method are described in the context of an aircraft; however, one of ordinary skill in the art will readily recognize that the disclosed service system may be utilized for a variety of different components for a variety of different types of vehicles. For example, implementations of the embodiments described herein may be implemented in any type of vehicle including, e.g., helicopters, passenger ships, automobiles and the like.

Although various embodiments of the disclosed system and method for molding amorphous polyether ether ketone have been shown and described, modifications may occur to those skilled in the art upon reading the specification. The present application includes such modifications and is limited only by the scope of the claims.

What is claimed is:

1. A fastener comprising:
    a fastener body comprising a shaft and a head; and
    a portion of polyether ether ketone connected to said head of said fastener body, said polyether ether ketone having a crystallinity of at most 5 percent.

2. The fastener of claim 1 wherein said polyether ether ketone has a crystallinity of at most about 2 percent.

3. The fastener of claim 1 wherein said polyether ether ketone has a crystallinity of at most about 1 percent.

4. The fastener of claim 1 wherein said polyether ether ketone has a crystallinity of about 0 percent.

5. The fastener of claim 1 wherein said fastener body is formed from a metallic material.

6. The fastener of claim 1 wherein said fastener body comprises titanium.

7. The fastener of claim 1 wherein said portion is connected to a top of said head.

8. The fastener of claim 1 wherein said shaft is threaded.

9. The fastener of claim 1 wherein said head comprises at least one engagement feature.

10. The fastener of claim 9 wherein said engagement feature comprises an undercut protrusion.

11. The fastener of claim 9 wherein said engagement feature comprises a roughed surface.

12. The fastener of claim 1 further comprising at least one tie layer positioned between said fastener body and said portion of polyether ether ketone.

13. An aircraft comprising the fastener of claim 1.

14. A fastener comprising:
    a fastener body comprising polyether ether ketone having a crystallinity of at most 5 percent.

15. The fastener of claim 14 wherein said polyether ether ketone has a crystallinity of at most about 2 percent.

16. The fastener of claim 14 wherein said polyether ether ketone has a crystallinity of at most about 1 percent.

17. The fastener of claim 14 wherein said polyether ether ketone has a crystallinity of about 0 percent.

18. The fastener of claim 14 wherein said fastener body comprises a shaft and a head.

19. The fastener of claim 18 wherein said polyether ether ketone has a crystallinity of at most about 2 percent.

20. An aircraft comprising the fastener of claim 14.

* * * * *